(12) United States Patent
Mantov

(10) Patent No.: US 6,377,481 B1
(45) Date of Patent: Apr. 23, 2002

(54) POWER SUPPLY INCLUDING DIODE RECOVERY CURRENT SUPPRESSION CIRCUIT

(75) Inventor: Gueorgui I. Mantov, Powell, OH (US)

(73) Assignee: Peco II, Inc., Galion, OH (US)

(*) Notice: Subject to any disclaimer, the term of this patent is extended or adjusted under 35 U.S.C. 154(b) by 0 days.

(21) Appl. No.: 09/592,772

(22) Filed: Jun. 13, 2000

Related U.S. Application Data
(60) Provisional application No. 60/141,631, filed on Jun. 30, 1999.

(51) Int. Cl.[7] .................... H02H 7/122; G05F 1/44
(52) U.S. Cl. ................ 363/56.12; 363/56.1; 323/282
(58) Field of Search .................. 363/56.1, 56.11, 363/56.12, 56.01; 323/282, 222

(56) References Cited

U.S. PATENT DOCUMENTS

| | | | |
|---|---|---|---|
| 4,357,654 A | 11/1982 | Ikenoue et al. ............... 363/21 |
| 4,513,360 A | 4/1985 | Ikenoue et al. ............... 363/20 |
| 4,688,157 A | 8/1987 | Rischmueller ............... 363/20 |
| 4,745,536 A | 5/1988 | Hirose et al. ................ 363/21 |
| 4,823,249 A | 4/1989 | Garcia, II ..................... 363/48 |
| 4,831,508 A | 5/1989 | Hunter ......................... 363/44 |
| 4,866,586 A | * 9/1989 | Suko ............................ 363/17 |
| 4,959,766 A | 9/1990 | Jain ............................. 363/48 |
| 4,977,493 A | 12/1990 | Smith .......................... 363/126 |
| 5,148,358 A | 9/1992 | Estes, Jr. ..................... 363/24 |
| 5,155,430 A | 10/1992 | Gulczynski ................. 363/224 |
| 5,264,736 A | * 11/1993 | Jacobson ................... 307/246 |
| 5,307,004 A | 4/1994 | Carsten ....................... 323/222 |
| 5,351,179 A | 9/1994 | Tsai et al. .................... 363/53 |
| 5,434,767 A | 7/1995 | Batarseh et al. ............. 363/16 |
| 5,481,238 A | 1/1996 | Carsten et al. .............. 336/214 |
| 5,486,752 A | 1/1996 | Hua et al. .................... 323/222 |
| 5,543,704 A | 8/1996 | Thorén ........................ 323/222 |
| 5,550,458 A | 8/1996 | Farrington et al. ......... 323/222 |
| 5,572,417 A | 11/1996 | Vinciarelli et al. ........... 363/89 |
| 5,621,631 A | 4/1997 | Vinciarelli et al. ........... 363/89 |
| 5,633,579 A | 5/1997 | Kim ............................ 323/222 |
| 5,633,787 A | 5/1997 | Song ............................. 363/21 |
| 5,636,114 A | * 6/1997 | Bhagwat ...................... 363/56 |
| 5,654,626 A | 8/1997 | Karlsson ..................... 323/222 |
| 5,694,302 A | 12/1997 | Faulk ............................ 363/16 |
| 5,771,168 A | 6/1998 | Liao et al. ................... 363/143 |
| 5,783,933 A | 7/1998 | Bailly .......................... 323/282 |
| 5,793,190 A | 8/1998 | Sahlström et al. .......... 323/222 |
| 5,815,386 A | 9/1998 | Gordon ........................ 363/50 |
| 5,841,268 A | 11/1998 | Mednik ....................... 323/222 |
| 5,886,880 A | 3/1999 | Hisanaga ..................... 363/20 |
| 5,943,200 A | * 8/1999 | He ............................... 361/56 |
| 6,043,636 A | * 3/2000 | Gaudreau et al. .......... 323/282 |
| 6,069,472 A | * 5/2000 | Pernyeszi ................... 323/282 |

FOREIGN PATENT DOCUMENTS

EP  0 430 242 A2  6/1991  ......... H03K/17/08

OTHER PUBLICATIONS

Hiroshi Sakamoto, Kazuhiro Kojima and Koosuke Harada, *Surge Suppression of a Boost Converter for Active Filter Using Saturable Inductor Commutation*, Department of Electronics, Kumamoto Institute of Technology, Kumamoto, Japan, dated Jun. 20, 1994, 4 pages.

International Search Report of the European Patent Office, corresponding to International Patent Application Ser. No. PCT/US00/16169, dated Oct. 12, 2000, 6 pages.

* cited by examiner

*Primary Examiner*—Bao Q. Vu
(74) *Attorney, Agent, or Firm*—Marshall, Gerstein, & Borun.

(57) ABSTRACT

Diode recovery current suppression circuits are disclosed for use with power supplies. A power supply circuit including the diode recovery current suppression circuit may include a main inductor and a main diode coupled to the end of the main inductor. In such a context, the diode recovery current suppression circuit can include (a) a set of additional inductive windings, (b) an auxiliary inductor, and (c) an auxiliary diode. The set of additional inductive windings are coupled to the end of the main inductor such that the diode recovery current suppression circuit is coupled in parallel with the main diode.

53 Claims, 5 Drawing Sheets

POWER SUPPLY INCLUDING DIODE RECOVERY CURRENT SUPPRESSION CIRCUIT

RELATED APPLICATION

This patent claims priority from U.S. Provisional Application Serial No. 60/141,631, which was filed on Jun. 30, 1999 and which is hereby incorporated in its entirety by reference.

FIELD OF THE INVENTION

The invention relates generally to power supplies, and, more particularly, to diode recovery current suppression circuits for use with power supplies.

BACKGROUND OF THE INVENTION

Most modern power supplies employ fast switching diodes to rectify the supplied output voltage. Diodes, of course, have two states, namely, an on state and an off state. In the on state a voltage is applied across the diode in the forward direction. In the off state, a reverse voltage is applied and the diode is intended to act as an open switch (i.e., no current flow).

Modern high frequency switching power supplies alternate between the on and off states very quickly. This quick alternation leads to a high change in voltage as a function of time (dv/dt) in the time period between the on and off states of the diode. This high dv/dt causes a reverse current flow (i.e., diode reverse recovery current) through the diode for a short period of time after the reverse voltage is applied across the diode.

The diode reverse recovery current is usually manifested by a high reverse current spike which can be several times higher than the forward current. This current spike increases converter EMI and converter losses. The time length of this current spike is usually 30–100 ns, or even more if low speed diodes are used. This short spike is known to be one of the main EMI sources in almost every power supply. It limits the switching frequency of the power supply and sometimes forces the designer to reduce the switching speed in order to reduce EMI, which also leads to lower efficiency.

There are many known methods for diode recovery current suppression. Most of these methods have limited application (i.e., they can work only on certain types of power converters). Other known solutions work only in cases of certain input and/or output conditions. Many known solutions involve complex circuits and active devices.

One prior art solution to diode recovery current suppression is illustrated in Carsten, U.S. Pat. No. 5,307,004. Carsten proposes the use of an auxiliary inductor (L2), an auxiliary diode (D2) and a second switch (Q2) to suppress reverse recovery current in a main diode (D1) of a boost regulator or a buck regulator. In either circuit arrangement, the auxiliary inductor (L2) is coupled to a tap on a main inductor (L1) so that one end of the auxiliary inductor (L2) is at a lower potential than the input to the main diode (D1). This circuit topology necessitates the inclusion of the second switch (Q2) to achieve current suppression.

DESCRIPTION OF THE PREFERRED EMBODIMENTS

Figure 1:
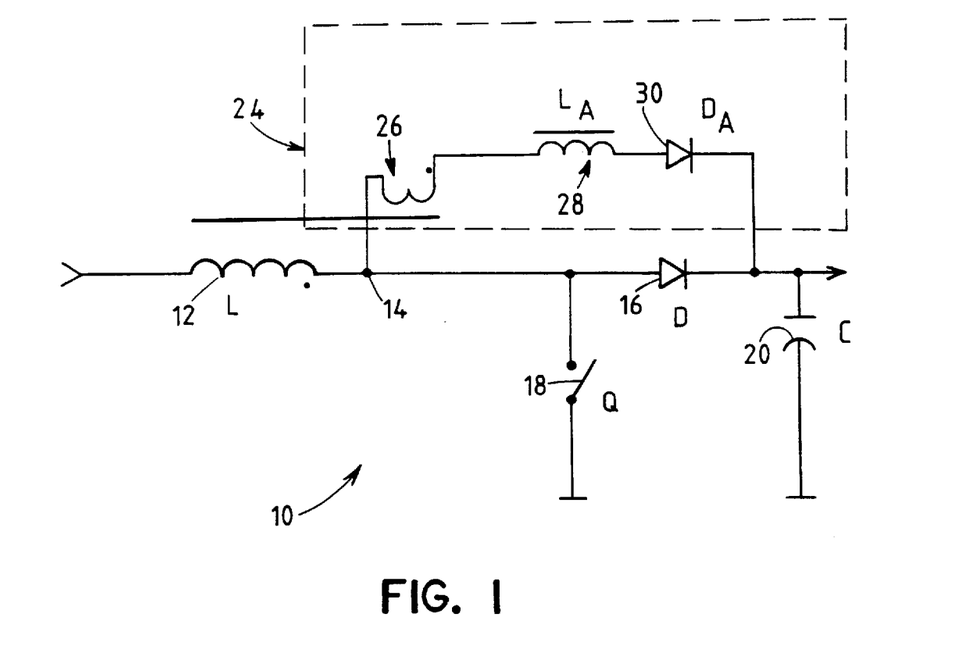
FIG. 1 is a schematic illustration of a booster power supply circuit constructed in accordance with the teachings of the instant invention.

A power supply circuit 10 constructed in accordance with the teachings of the invention is shown in FIG. 1. Although the power supply circuit 10 is a boost regulator, persons of ordinary skill in the art will readily appreciate that the teachings of the invention are not limited to any particular type of power supply. On the contrary, the teachings of the invention can be applied to any switching power supply which would benefit from the reduced diode reverse recovery current it provides without departing from the scope or spirit of the invention. To illustrate this point, exemplary ways of applying the teachings of the invention to other types of switchmode power supplies including a buck regulator (FIG. 3), and a fly-back regulator (FIG. 4) are described below. As used herein, the term "power supply circuit" is intended to cover an entire power supply or a portion of a power supply.

Returning to the topic of booster power supply circuits, a booster regulator circuit is the most common first stage of a two-stage rectifier with high power factor. Diode recovery current is considered to be a major problem in these types of circuits. Booster power supply 10 of FIG. 1 includes a main inductor 12. The power supply 10 also includes a main diode 16, the anode of which is coupled to an end 14 of the main inductor 12. For the purpose of selectively at least partially discharging the main inductor 12, a switch 18, which is preferably implemented by a transistor, is coupled between the anode of the main diode 16 and ground. An output capacitor 20 is connected between the cathode of the main diode 16 and ground.

In accordance with an aspect of the invention, a diode recovery current suppression circuit 24 is provided. In the example of FIG. 1, the current suppression circuit 24 includes a set of additional inductive windings 26, an auxiliary inductor 28 and an auxiliary diode 30. In the example of FIG. 1, the set of additional windings 26 is coupled to the end of the main inductor 12, the additional windings 26, the auxiliary inductor 28, and the auxiliary diode 30 are coupled in series, and the diode recovery suppression circuit 24 is coupled in parallel with the main diode 16.

In operation, the switch 18 is first closed and the main inductor 12 is charged by a suitable power source (i.e., current flows through the closed switch 18). Then, at an appropriate time, the switch 18 is opened. Because the auxiliary inductor 28 cannot conduct current immediately, the discharge current from the main inductor 12 initially flows entirely through the main diode 16 (e.g., the current flow through diode 16 substantially equals the discharge current flowing from the main inductor 12). Thereafter, because the voltage across the current suppression circuit is high, the auxiliary inductor 28 begins to conduct, and the current through the main diode 16 decreases to zero. When the switch 18 is first opened, the auxiliary inductor 28 ensures the current flow through the auxiliary diode 30 is initially zero and thereafter increases until it becomes equal to the current flowing from the main inductor 12 when the current passing through the main diode 16 terminates. Subsequently, the switch 18 is closed to recharge the main inductor 12. Because the current through the main diode 16 is zero when the switch closes (i.e., all discharge current from the main inductor 12 is carried by the auxiliary diode 30), the main diode 16 experiences no reverse recovery current when the switch 18 is closed.

Figure 2:
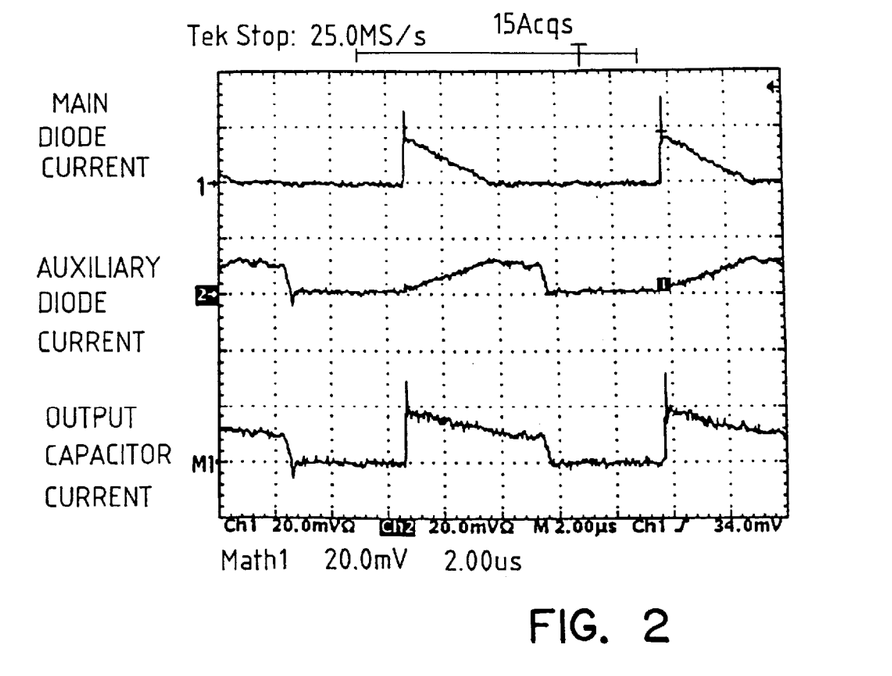
FIG. 2 is a graph illustrating the current through the main diode, the current through the auxiliary diode, and the capacitor charging current as a function of time.

FIG. 2 illustrates the operation of the circuit of FIG. 1 in greater detail. In FIG. 2, the top graph illustrates current through the main diode 16, the middle graph illustrates current through the auxiliary diode 30, and the bottom graph illustrates the sum of the currents through the diodes 16, 30 (i.e., the charging current at the output capacitor 20.) As shown in FIG. 2, when the switch 18 is first opened, the main inductor 12 starts to discharge its energy to charge the capacitor and all of the capacitor charging current is carried by the main diode 16. The current through the main diode 16 then begins to decrease as the current through the auxiliary diode 30 begins to increase. When the current through the auxiliary diode 30 becomes equal to the main inductor current, the current through the main diode 16 becomes equal to zero, and stays zero until the switch 18 closes. At the moment the switch 18 is closed, there is no diode recovery current through the main diode 16 because its previous state is with zero current. The diode recovery current through the auxiliary diode 30 is also negligible because the current through auxiliary inductor 28 cannot change direction abruptly.

The capacitor charging current is the same as in the regular booster (i.e., a booster circuit without the recovery current suppression circuit 24). Therefore, the diode recovery current suppression circuit 24 does not have a noticeable effect on other aspects of the booster regulator performance.

From the foregoing, persons of ordinary skill in the art will appreciate that the auxiliary inductor 28 performs several functions. It controls distribution of the discharging current between the main diode 16 and the auxiliary diode 30. It also reduces and preferably substantially eliminates reverse recovery current in the auxiliary diode 30. In the example of FIG. 1, the inductance of the auxiliary inductor 28 is 16 uH and the auxiliary inductor 28 may optionally be saturable.

From the foregoing, persons of ordinary skill in the art will further appreciate that the set of additional inductive windings 26 functions primarily to ensure the voltage across the recovery current suppression circuit 24 will eventually be sufficient to switch off the main diode 16. As such, the additional windings 26 need not have a large inductance. As a result, in the example of FIG. 1, the additional windings 26 have significantly fewer turns than the main inductor 12. For example, in the circuit of FIG. 1, the additional windings 26 have 5 turns and the main inductor has 51 turns. The additional set of windings 26 may optionally be wound on the same core as the main inductor 12. Persons of ordinary skill in the art will readily appreciate that the inductance of the inductive components 12, 26, 28 of FIG. 1 can be varied without departing from the scope or spirit of the invention. However, the inductances of those components 12, 26, 28 are preferably selected and the switch 18 is preferably controlled such that, the main inductor 12 discharges for a predetermined time period and the diode reverse recovery current suppression circuit 24 terminates current flow through the main diode 16 prior to termination of the predetermined time period.

Persons of ordinary skill in the art will also appreciate that although in the example of FIG. 1, the main diode 16, the switch 18, and the additional windings 26 are connected to an end of the main inductor 12, the additional windings 26 may optionally comprise a portion of the main inductor 12, and the main diode 16 and switch 18 may be coupled to a tap 14 between the additional windings 26 and the remainder of the main inductor 12 without departing from the scope or spirit of the invention.

Figure 3:
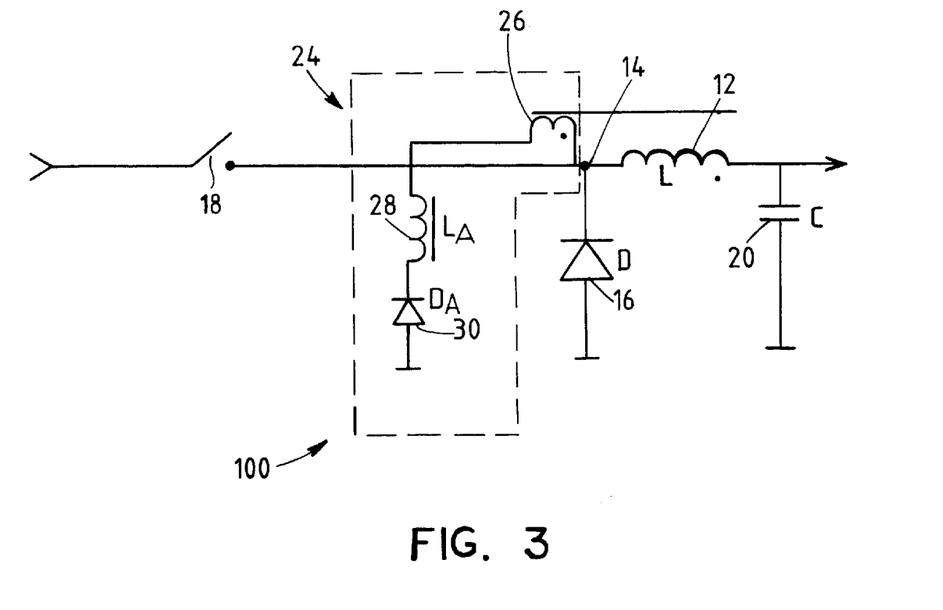
FIG. 3 is a schematic illustration of a buck regulator power supply circuit constructed in accordance with the teachings of the invention.

As mentioned above, the teachings of the invention are not limited to booster regulators such as that shown in FIG. 1. On the contrary, the teachings of the invention can be applied to a wide range of power supply circuits. For example, a Buck converter 100 constructed in accordance with the teachings of the invention is shown in FIG. 3. In the example of FIG. 3, and all of the other examples that follow, like components (although not necessarily in size) have been labeled with like reference numerals.

In the example of FIG. 3, one end of the main inductor 12 is coupled to the output capacitor 20 and the other end is coupled to the switch 18 and the main diode 16. The anode of the main diode 16 is connected to ground. The reverse recovery current suppression circuit 24 is coupled in parallel with the main diode 16 and includes a set of additional inductive windings 26, an auxiliary inductor 28 and an auxiliary diode 30.

As with the booster circuit 10, when the switch 18 opens, initially all of the capacitor charging current is carried by the main diode 16. Thereafter, the current through main diode 16 gradually decreases, while the auxiliary diode current increases until, at one moment, the current through the main diode 16 becomes zero and the auxiliary diode 30 takes all of the main inductor current. At the moment of closing the switch 18, there is no diode recovery current through the main diode 16 because its immediately previous state is with zero current. The diode recovery current through the auxiliary diode 30 is also negligible because the current through the auxiliary inductor 28 cannot change direction abruptly.

Persons of ordinary skill in the art will appreciate that the comments made above concerning the various implementation options for the booster circuit 10 apply with equal force to the Buck regulator 100. For example, a main inductor with a tap can be substituted for the main inductor 12 and the additional inductive windings 26 without departing from the scope or spirit of the invention.

Figure 4:
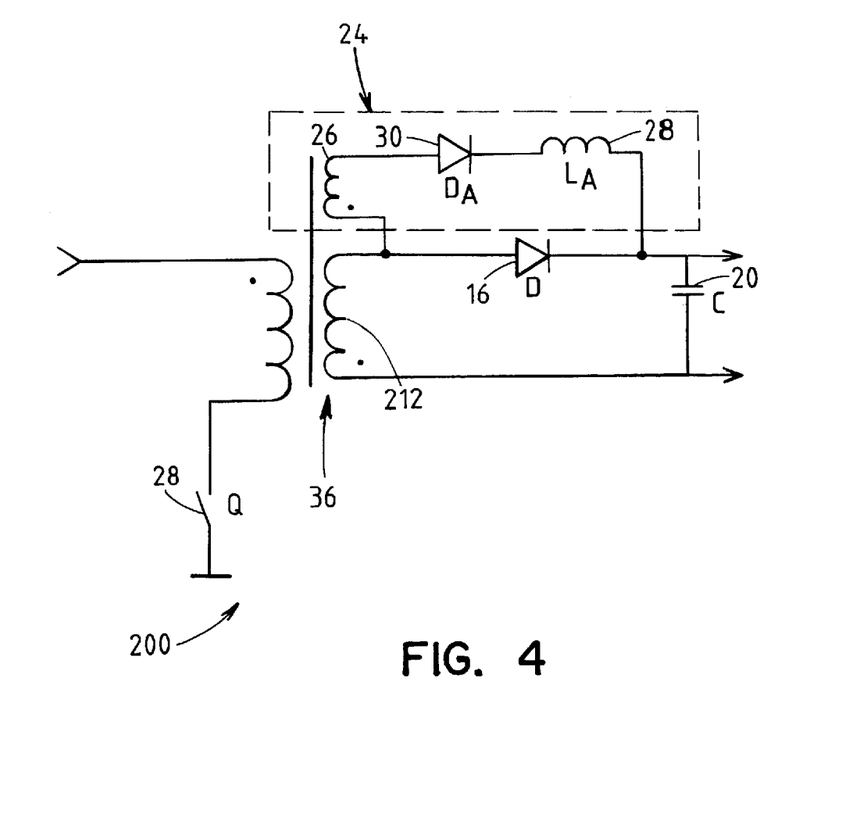
FIG. 4 is a schematic illustration of a fly-back regulator power supply circuit constructed in accordance with the teachings of the invention.

Another power supply circuit 200 constructed in accordance with the teachings of the invention is shown in FIG. 4. The power supply circuit 200 is a fly-back regulator operating in continuous current mode.

The fly-back regulator working in continuous current mode also has a problem with diode recovery current. In this type of regulator, there is no separate output (main) inductor. Instead, a transformer 36 performs the energy storage function, thus behaving as the main inductor 12. (In other words, the main inductor 212 comprises part (i.e., the secondary) of the transformer 36). In the fly-back converter depicted in FIG. 4, an auxiliary diode 30, a small auxiliary inductor 28 and a few more turns 26 on the secondary winding of the transformer 36 are connected in series to form a recovery current suppression circuit 24. The current suppression circuit 24 is placed in parallel with the rectifying diode 16.

When the switch 28 opens, the current through the main diode 16 is initially equal to the current through the secondary of the transformer 36 and thereafter gradually decreases. Conversely, the auxiliary diode current is initially zero and then increases until, at one moment, the current through the main diode 16 becomes zero and the auxiliary diode 30 takes all of the current. At the moment of closing the switch 18, no diode recovery current passes through the main diode 16 because its previous state is with zero current. The diode recovery current through the auxiliary diode 30 is also very small because of the auxiliary inductor 28.

Figure 5:
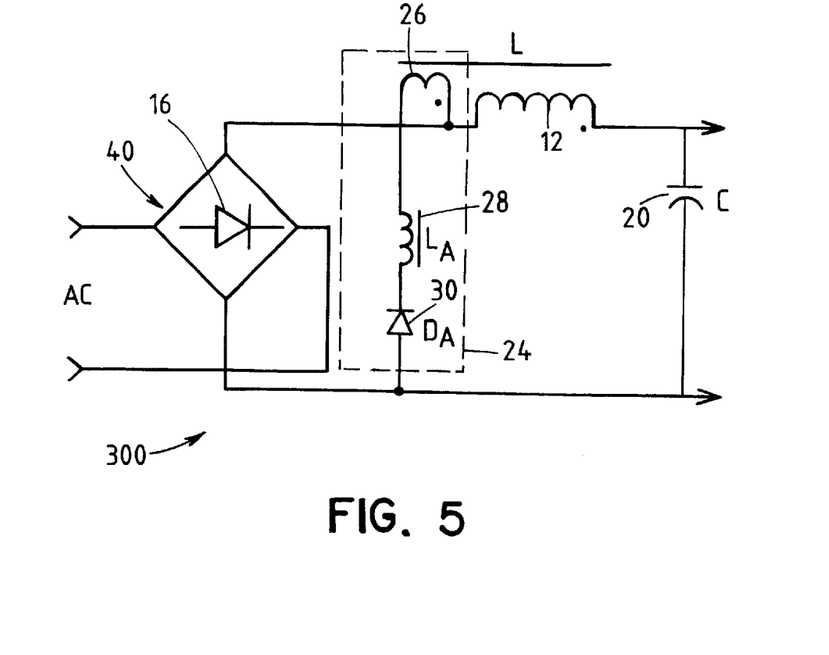
FIG. 5 is a schematic illustration of another power supply circuit constructed in accordance with the teachings of the invention and including a full bridge rectifier.

Still another power supply circuit 300 constructed in accordance with the teachings of the invention is shown in FIG. 5. The function and structure of the power supply circuit 300 is similar to the circuits described above. In particular, it includes an output capacitor 20, a main inductor 12, and a reverse recovery current suppression circuit 24 including a set of additional inductive windings 26, an auxiliary inductor 28 and an auxiliary diode 30 functioning in the same way as explained above. However, in the circuit 300 of FIG. 5, the main diode 16 comprises at least one diode in a full bridge rectifier 40 which acts upon an AC power signal to produce a rectified AC input to the main inductor 12.

Figure 6:
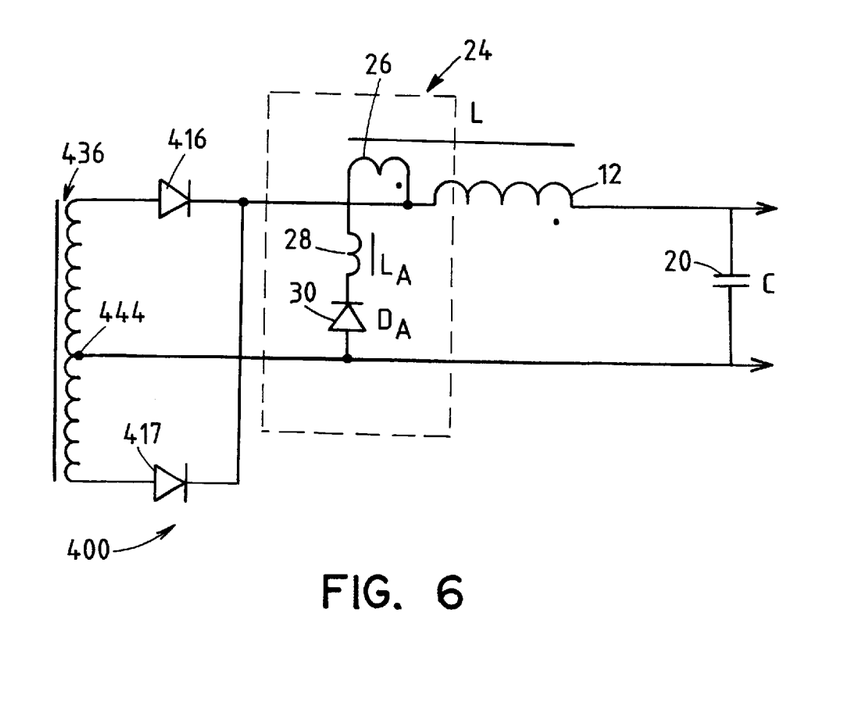
FIG. 6 is a schematic illustration of another power supply circuit constructed in accordance with the teachings of the invention and including a half-bridge rectifier.

Another power supply 400 circuit constructed in accordance with the teachings of the invention is shown in FIG. 6. The function and structure of the power supply circuit 400 is similar to the circuit 300 described above. Thus, it includes an output capacitor 20, a main inductor 12, a switch (not shown) and a reverse recovery current suppression circuit 24 including a set of additional inductive windings 26, an auxiliary inductor 28, and an auxiliary diode 30 functioning in the same way explained above. However, in the circuit 400 of FIG. 6, the main diode actually comprises two diodes 416, 417 comprising a half-bridge rectifier coupled to a transformer 436. An anode of one of the diodes 416 is coupled to one end of the transformer 436. An anode of the other diode 417 is coupled to the other end of the transformer 436. The cathodes of the diodes 416, 417 are coupled to an end of the main inductor 12. In the example of FIG. 6, the diode reverse recovery current suppression circuit 24 is coupled to a tap 444 of the transformer 436.

Figure 7:
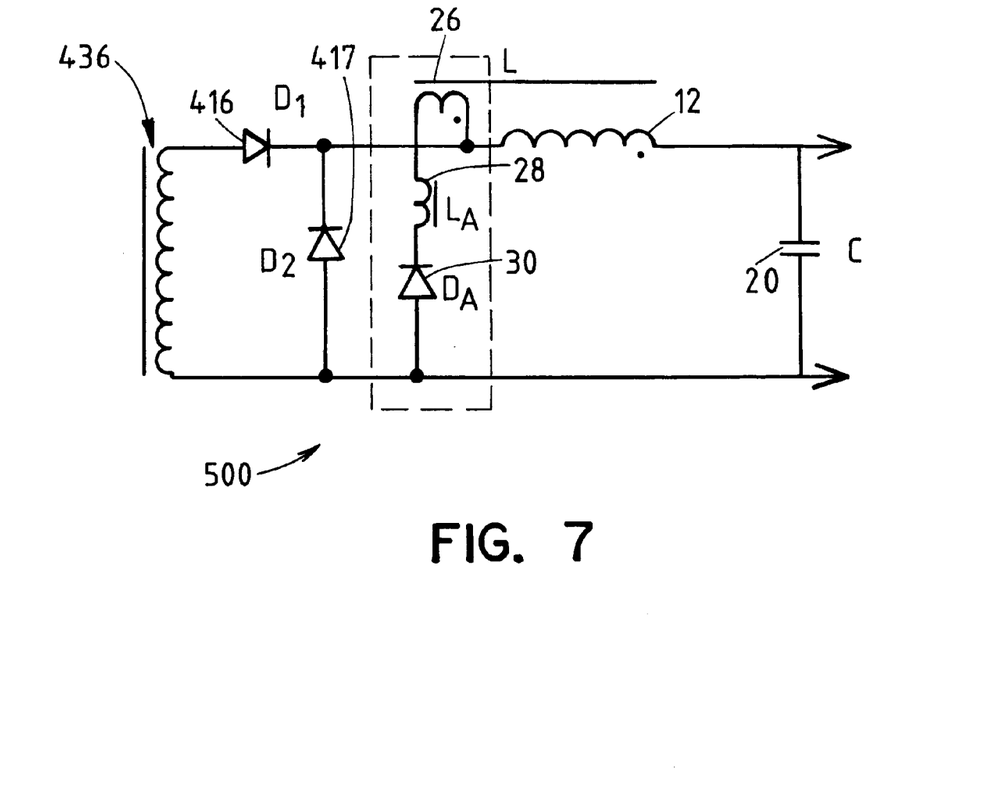
FIG. 7 is a schematic illustration of another power supply circuit constructed in accordance with the teachings of the invention.

Another power supply circuit 500 constructed in accordance with the teachings of the invention is shown in FIG. 7. The example of FIG. 7 is substantially identical to the example of FIG. 6. However, in the example of FIG. 7, the diode reverse recovery current suppression circuit 24 is not coupled to a tap 444 of the transformer 436, but instead is coupled to the anode of the diode 417.

Figure 8:
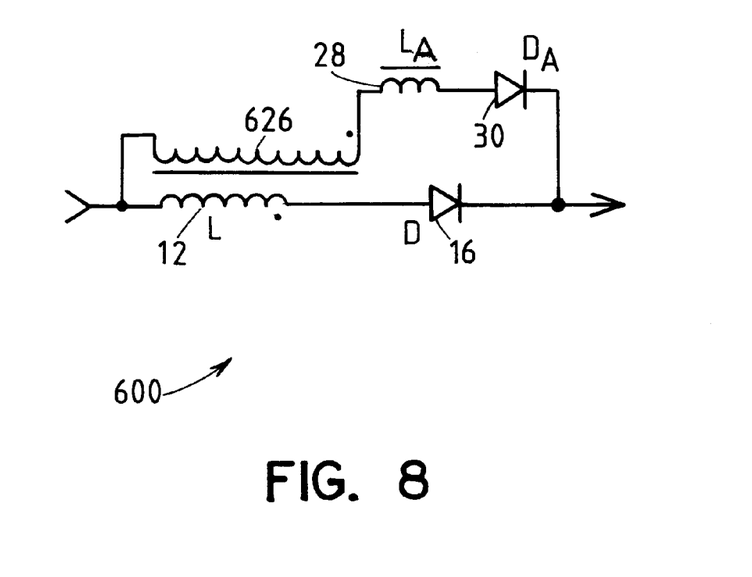
FIG. 8 is a schematic illustration of another power supply circuit constructed in accordance with the teachings of the invention.

Another power supply circuit 600 constructed in accordance with the teachings of the invention is shown in FIG. 8. The circuit 600 of FIG. 8 includes a main inductor 12, a main diode 16, an auxiliary inductor 28 and an auxiliary diode 30. Although not shown in FIG. 8, it will also include a switch (not shown) and may also include an output capacitor. However, rather than including a set of additional inductive windings 26, the circuit 600 includes a supplemental inductor 626 wound on the same core as main inductor 12 and including several more turns than the main inductor 12. One end of the supplemental winding 626 is coupled to an end of the main inductor 12. The other end of the supplemental winding 626 is connected in series with the auxiliary inductor 28 and/or the auxiliary diode 30. The voltage at the node between the supplemental inductor 626 and the auxiliary winding 28 is higher than the voltage at the node between the main inductor 12 and the main diode 16 by virtue of the additional windings on the supplemental inductor 626.

It will be evident to persons of ordinary skill in the art that the circuit 600 of FIG. 8 functions similarly to the circuit 10 of FIG. 1, and, in the interest of brevity, that functionality will not be repeated here.

Figure 9:
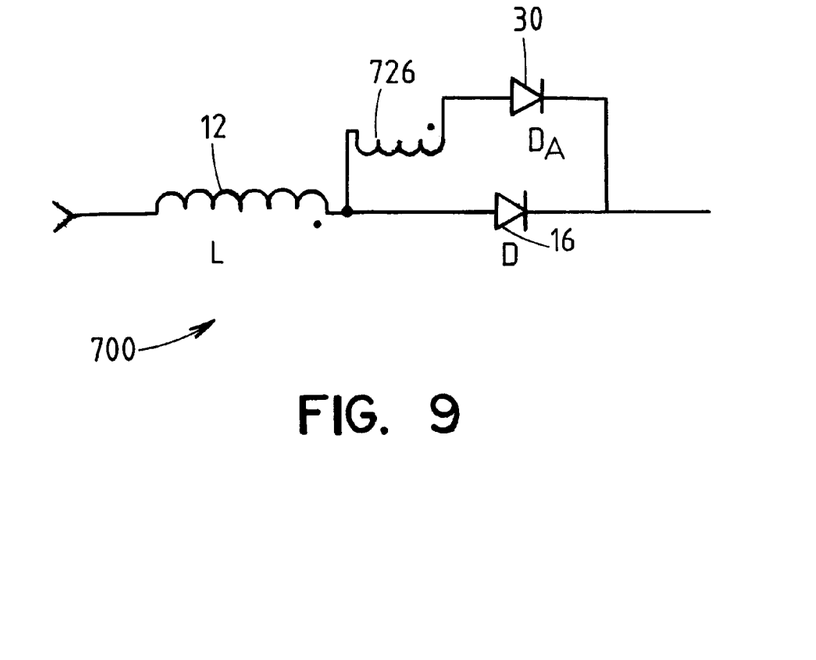
FIG. 9 is a schematic illustration of another power supply circuit constructed in accordance with the teachings of the invention.

Still another circuit 700 constructed in accordance with the teachings of the invention is shown in FIG. 9. This circuit 700 is similar to the circuits described above. Thus, it includes a main inductor 12, a main diode 16, an auxiliary diode 30, an additional set of windings 726, an output capacitor (not shown) and a switch (not shown). In this example, however, the leakage inductance of the set of additional windings 726 is sufficiently high to enable elimination of the auxiliary inductor while retaining the functionality of that omitted element. In other words, the set of additional windings 726 acts as a virtual auxiliary inductor.

Figure 10:
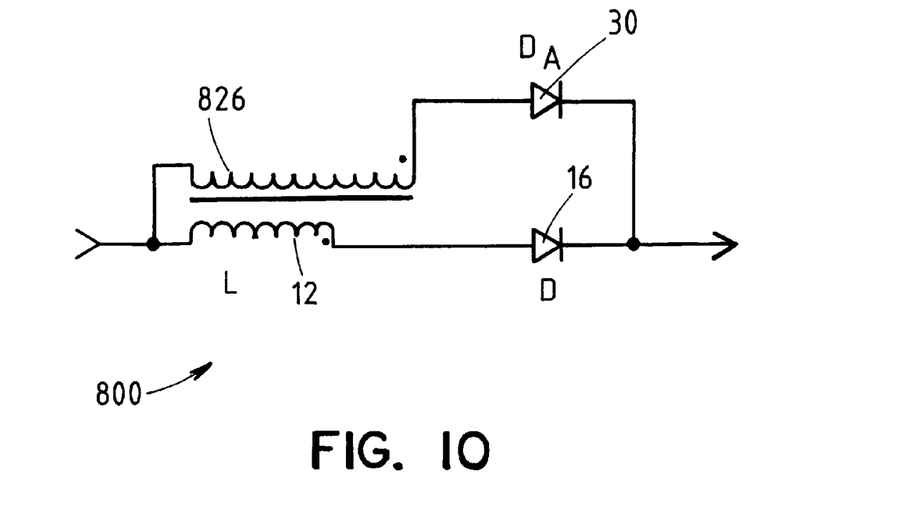
FIG. 10 is a schematic illustration of another power supply circuit constructed in accordance with the teachings of the invention.

The example of FIG; 9 can be applied to any of the circuits described above (e.g., FIGS. 1–8) to eliminate the auxiliary inductor 28 without departing from the scope or spirit of the invention. A power supply circuit 800 constructed in accordance with the teachings of the invention and merging the examples of FIGS. 8 and 9 is shown in FIG. 10. The circuit of FIG. 10 includes a main inductor 12, a main diode 16, an auxiliary diode 30, an output capacitor (not shown) and a switch (not shown). In this example, however, the auxiliary inductor has been eliminated and replaced with a supplemental inductor 826 wound on the same core as the main inductor 12 and having sufficient leakage inductance to perform the function of the auxiliary inductor (e.g., a virtual auxiliary inductor ) while also performing the function of the set of additional inductive windings present in earlier described circuits.

In all of the examples shown in FIGS. 1–10, the auxiliary diode 30 gradually takes the current from main diode 16 (416, 417), and, thus, when reverse voltage is applied across the main diode, the main diode 16 (416, 417) experiences little or preferably no recovery current. The recovery current of the auxiliary diode 30 is also suppressed by the auxiliary inductor in series with the diode 30. In some implementations this auxiliary inductor can be the leakage inductance of the windings on the inductor core.

From the foregoing, persons of ordinary skill in the art will appreciate that improved, economic ways to suppress diode recovery current in power supplies have been disclosed. The disclosed power circuits achieve higher frequency conversion with a lower level of noise and reduced switching losses thereby achieving greater efficiency.

The disclosed circuits achieve suppression of the reverse current spike using low cost passive components. These passive components force the discharge current to alternate between two (or optionally more) diodes in such a way that each diode experiences a low di/dt rate. Moreover, the sum of the current through these diodes is substantially equivalent to the normal current that would flow without the suppression circuit. Furthermore, the disclosed circuits eliminate the expensive second switch of prior art circuits such as that disclosed in Carsten, U.S. Pat. No. 5,307,004 while still achieving current suppression. Additionally, the disclosed circuits can be used with control techniques common to power supplies and do not require special control circuitry.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A power supply circuit comprising:
   a main inductor having a first end, a second end and a tap between the first and second ends;
   a main diode coupled to the tap of the main inductor; and
   a diode recovery current suppression circuit including an auxiliary inductor and an auxiliary diode coupled in series, the diode recovery current suppression circuit being coupled to the second end of the main inductor, wherein charging current from the main inductor flows through the main diode and the auxiliary diode, the current flowing through the main diode initially being substantially equal to the charging current flowing from the main inductor and thereafter decreasing to substantially zero, and the current flowing through the auxiliary diode being substantially zero when the current flowing through the main diode is substantially equal to the charging current and thereafter increasing until it becomes substantially equal to the charging current flowing from the main inductor.

2. A power supply circuit as defined in claim 1 further comprising a switch in circuit with the main inductor for selectively at least partially discharging the main inductor.

3. A power supply circuit as defined in claim 1 wherein the main inductor comprises part of a transformer.

4. A power supply circuit as defined in claim 3 further comprising a switch in circuit with the transformer for selectively at least partially discharging the main inductor.

5. A power supply circuit as defined in claim 1 further comprising an output capacitor in circuit with the main diode and the diode recovery suppression circuit.

6. A power supply circuit as defined in claim 1 wherein the current flowing through the main diode reaches zero before discharging of the main inductor energy is terminated.

7. A power supply circuit as defined in claim 1 further comprising a switch in circuit with the main inductor for selectively at least partially discharging the main inductor, wherein the current flowing through the main diode reaches zero before the switch changes state to terminate discharging of the main inductor.

8. A power supply circuit as defined in claim 1 wherein the auxiliary inductor functions to control distribution of the capacitor charging current between the main diode and the auxiliary diode.

9. A power supply circuit as defined in claim 1 wherein the auxiliary inductor performs at least one of reducing and eliminating reverse recovery current in the auxiliary diode.

10. A power supply circuit as defined in claim 1 wherein energy from the main inductor charges a capacitor for a predetermined time period, and the diode reverse recovery current suppression circuit terminates current flow through the main diode prior to termination of the predetermined time period.

11. A power supply circuit as defined in claim 1 wherein the power supply circuit comprises a switchmode power converter.

12. A power supply circuit as defined in claim 1 wherein at least some of the components of the power supply circuit form at least a portion of a boost regulator.

13. A power supply circuit as defined in claim 1 wherein at least some of the components of the power supply circuit form at least a portion of a buck regulator.

14. A power supply circuit as defined in claim 1 wherein at least some of the components of the power supply circuit form at least a portion of a fly-back regulator.

15. A power supply circuit as defined in claim 14 wherein the fly-back regulator is structured to operate in continuous mode.

16. A power supply circuit as defined in claim 1 wherein the main diode comprises at least a portion of a full bridge rectifier.

17. A power supply circuit comprising:
    a main inductor having a first end, a second end and a tap between the first and second ends;
    a main diode coupled to the tap of the main inductor; and
    a diode recovery current suppression circuit including an auxiliary inductor and an auxiliary diode coupled in series, the diode recovery current suppression circuit being coupled to the second end of the main inductor, wherein the main diode comprises a first diode and a second diode, an anode of the first diode being connected to a first end of a transformer, an anode of the second diode being connected to a second end of the transformer, and cathodes of the first and second diodes being coupled to the tap of the main inductor.

18. A power supply circuit as defined in claim 17 wherein the diode reverse current suppression circuit is coupled to a tap of the transformer.

19. A power supply circuit as defined in claim 17 wherein the diode reverse current suppression circuit is coupled to the second end of the transformer.

20. A power supply circuit comprising:
    a main inductor having a first end, a second end and a tap between the first and second ends;
    a main diode coupled to the tap of the main inductor; and
    a diode recovery current suppression circuit including an auxiliary inductor and an auxiliary diode coupled in series, the diode recovery current suppression circuit being coupled to the second end of the main inductor, wherein the diode recovery suppression circuit is coupled in parallel with the main diode.

21. A power supply circuit comprising:
    a main inductor having an end;
    a main diode coupled to the end of the main inductor; and
    a diode recovery current suppression circuit including: (a) a set of additional inductive windings, (b) an auxiliary inductor, and (c) an auxiliary diode, the set of additional inductive windings being coupled to the end of the main inductor, wherein the diode recovery suppression circuit is coupled in parallel with the main diode.

22. A power supply circuit as defined in claim 21 wherein the set of additional inductive windings, the auxiliary inductor and the auxiliary diode are coupled in series.

23. A power supply circuit as defined in claim 21 wherein the main inductor has more turns than the set of additional windings.

24. A power supply circuit as defined in claim 21 wherein at least one of the auxiliary inductor and the auxiliary diode is coupled to a first end of the set of inductive windings opposite a second end of the set of inductive windings, the second end of the set of inductive windings being coupled to the end of the main inductor.

25. A power supply circuit as defined in claim 21 further comprising a switch in circuit with the main inductor for selectively at least partially discharging energy from the main inductor.

26. A power supply circuit as defined in claim 21 wherein the main inductor comprises part of a transformer.

27. A power supply circuit as defined in claim 26 further comprising a switch in circuit with the transformer for selectively at least partially discharging the main inductor.

28. A power supply circuit as defined in claim 21 further comprising an output capacitor in circuit with the main diode and the diode recovery suppression circuit.

29. A power supply circuit as defined in claim 21 wherein charging current from the main inductor flows through the main diode and the auxiliary diode, the current flowing through the main diode initially being substantially equal to the charging current flowing from the main inductor and thereafter decreasing to substantially zero, and the current flowing through the auxiliary diode being substantially zero when the current flowing through the main diode is substantially equal to the charging current and thereafter increasing until it becomes substantially equal to the charging current flowing from the main inductor.

30. A power supply circuit as defined in claim 29 wherein the current flowing through the main diode reaches substantially zero before discharging of the main inductor is terminated.

31. A power supply circuit as defined in claim 29 further comprising a switch in circuit with the main inductor for selectively at least partially discharging energy from the main inductor, wherein the current flowing through the main diode reaches substantially zero before the switch changes state to terminate discharging the energy of the main inductor.

32. A power supply circuit as defined in claim 29 wherein the auxiliary inductor functions to control distribution of the discharging current between the main diode and the auxiliary diode.

33. A power supply circuit as defined in claim 21 wherein the auxiliary inductor performs at least one of reducing and eliminating reverse recovery current in the auxiliary diode.

34. A power Supply circuit as defined in claim 28 wherein the main inductor charges the capacitor for a predetermined time period, and the diode reverse recovery current suppression circuit terminates current flow through the main diode prior to termination of the predetermined time period.

35. A power supply circuit as defined in claim 21 wherein the power supply circuit comprises a switchmode power converter.

36. A power supply circuit as defined in claim 21 wherein at least some of the components of the power supply circuit form at least a portion of a boost regulator.

37. A power supply circuit as defined in claim 21 wherein at least some of the components of the power supply circuit form at least a portion of a buck regulator.

38. A power supply circuit as defined in claim 21 wherein at least some of the components of the power supply circuit form at least a portion of a fly-back regulator.

39. A power supply circuit as defined in claim 38 wherein the fly-back regulator is structured to operate in continuous mode.

40. A power supply circuit as defined in claim 21 wherein the main diode comprises at least a portion of a full bridge rectifier.

41. A power supply circuit as defined in claim 21 wherein the main diode comprises a first diode and a second diode, an anode of the first diode being connected to a first end of a transformer, an anode of the second diode being connected to a second end of the transformer, and cathodes of the first and second diodes being coupled to the end of the main inductor.

42. A power supply circuit as defined in claim 41 wherein the diode reverse current suppression circuit is coupled to a tap of the transformer.

43. A power supply circuit as defined in claim 41 wherein the diode reverse current suppression circuit is coupled to the second end of the transformer.

44. A power supply circuit comprising:
a main inductor having an end;
a main diode coupled to the end of the main inductor; and
a diode recovery current suppression circuit including: (a) a supplemental inductor, (b) an auxiliary inductor, and (c) an auxiliary diode, the supplemental inductor being wound on the same core as the main inductor and having more turns than the main inductor.

45. A power supply circuit comprising:
a main inductor having an end;
a main diode coupled to the end of the main inductor; and
a diode recovery current suppression circuit including: (a) a set of additional inductive windings, and (b) an auxiliary diode, wherein the set of additional inductive windings is wound on the same core as the main inductor, the set of additional inductive windings having more turns than the main inductor, and the set of additional inductive windings having sufficient leakage inductance to function as a virtual auxiliary inductor.

46. A power supply circuit comprising:
a main inductor having an end;
a main diode coupled to the end of the main inductor; and
a diode recovery current suppression circuit including: (a) a set of additional inductive windings, (b) an auxiliary inductor, and (c) an auxiliary diode, the set of additional inductive windings being coupled to the end of the main inductor, wherein at least one of the auxiliary inductor and the auxiliary diode is coupled to a first end of the set of inductive windings opposite a second end of the set of inductive windings, the second end of the set of inductive windings being coupled to the end of the main inductor.

47. A power supply circuit comprising:
a main inductor having an end;
a main diode coupled to the end of the main inductor; and
a diode recovery current suppression circuit including: (a) a set of additional inductive windings, (b) an auxiliary inductor, and (c) an auxiliary diode, the set of additional inductive windings being coupled to the end of the main inductor, wherein charging current from the main inductor flows through the main diode and the auxiliary diode, the current flowing through the main diode initially being substantially equal to the charging current flowing from the main inductor and thereafter decreasing to substantially zero, and the current flowing through the auxiliary diode being substantially zero when the current flowing through the main diode is substantially equal to the charging current and thereafter increasing until it becomes substantially equal to the charging current flowing from the main inductor.

48. A power supply circuit as defined in claim 47 wherein the current flowing through the main diode reaches substantially zero before discharging of the main inductor is terminated.

49. A power supply circuit as defined in claim 47 further comprising a switch in circuit with the main inductor for selectively at least partially discharging energy from the main inductor, wherein the current flowing through the main diode reaches substantially zero before the switch changes state to terminate discharging the energy of the main inductor.

50. A power supply circuit as defined in claim 47 wherein the auxiliary inductor functions to control distribution of the discharging current between the main diode and the auxiliary diode.

51. A power supply circuit comprising:

a main inductor having an end;

a main diode coupled to the end of the main inductor; and a diode recovery current suppression circuit including: (a) a set of additional inductive windings, (b) an auxiliary inductor, and (c) an auxiliary diode, the set of additional inductive windings being coupled to the end of the main inductor, wherein the main diode comprises a first diode and a second diode, an anode of the first diode being connected to a first end of a transformer, an anode of the second diode being connected to a second end of the transformer, and cathodes of the first and second diodes being coupled to the end of the main inductor.

52. A power supply circuit as defined in claim 51 wherein the diode reverse current suppression circuit is coupled to a tap of the transformer.

53. A power supply circuit as defined in claim 51 wherein the diode reverse current suppression circuit is coupled to the second end of the transformer.

* * * * *